United States Patent
Li

(10) Patent No.: US 11,025,535 B2
(45) Date of Patent: Jun. 1, 2021

(54) DETECTING PATH

(71) Applicant: NEW H3C TECHNOLOGIES CO., LTD., Hangzhou (CN)

(72) Inventor: Jinglin Li, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 16/499,219

(22) PCT Filed: Apr. 2, 2018

(86) PCT No.: PCT/CN2018/081573
§ 371 (c)(1),
(2) Date: Sep. 27, 2019

(87) PCT Pub. No.: WO2018/177438
PCT Pub. Date: Apr. 10, 2018

(65) Prior Publication Data
US 2020/0036627 A1  Jan. 30, 2020

(30) Foreign Application Priority Data
Mar. 31, 2017 (CN) .......................... 201710209173.8

(51) Int. Cl.
*H04L 12/721* (2013.01)
*H04L 1/00* (2006.01)
(Continued)

(52) U.S. Cl.
CPC ............ *H04L 45/26* (2013.01); *H04L 1/0072* (2013.01); *H04L 43/10* (2013.01); *H04L 45/745* (2013.01)

(58) Field of Classification Search
None
See application file for complete search history.

(56) References Cited

U.S. PATENT DOCUMENTS 6,765,931 B1 * 7/2004 Rabenko .................. H04B 3/23
 348/E7.049
9,461,877 B1 * 10/2016 Nadeau ................. H04L 41/042
(Continued)

FOREIGN PATENT DOCUMENTS

CN 101404597 A 4/2009
CN 102340451 A 2/2012
(Continued)

OTHER PUBLICATIONS

State Intellectual Property Office of the People's Republic of China, Office Action and Search Report Issued in Application No. 201710209173.8, dated Apr. 2, 2020, 9 pages. (Submitted with Machine Translation).

(Continued)

*Primary Examiner* — Ajit Patel
(74) *Attorney, Agent, or Firm* — McCoy Russell LLP

(57) ABSTRACT

Methods of detecting a path and forwarding devices are disclosed. In an example of the present disclosure, a first forwarding device constructs a detection packet for a service flow, wherein forwarding information in a packet head of the detection packet is same as forwarding information in a packet head of the service flow; forwards the detection packet based on the forwarding information in the packet head of the detection packet; when an error controlling packet corresponding to the detection packet is received from a second forwarding device in a set time period, the first forwarding device determines an address of the second forwarding device, returns to perform a process of constructing the detection packet for the service flow; otherwise, determines the path of the service flow based on the at least one respective address of the at least one second forwarding device.

13 Claims, 5 Drawing Sheets

(51) Int. Cl.
*H04L 12/26* (2006.01)
*H04L 12/741* (2013.01)

(56) References Cited

U.S. PATENT DOCUMENTS

| | | | |
|---|---|---|---|
| 2005/0243733 | A1 | 11/2005 | Crawford et al. |
| 2006/0098586 | A1 | 5/2006 | Farrell et al. |
| 2009/0086645 | A1 | 4/2009 | Hedayat et al. |
| 2010/0271960 | A1 | 10/2010 | Krygowski |
| 2014/0105039 | A1* | 4/2014 | McDysan ............... H04L 45/02 370/252 |
| 2016/0142474 | A1* | 5/2016 | Itsumi ................ H04L 12/4625 370/390 |
| 2016/0212050 | A1* | 7/2016 | Yin ........................ H04L 45/08 |
| 2017/0331794 | A1* | 11/2017 | Lokman ............. H04L 63/0471 |
| 2017/0339109 | A1* | 11/2017 | Zeng ................ G05B 19/41855 |

FOREIGN PATENT DOCUMENTS

| | | | |
|---|---|---|---|
| CN | 102984232 | A | 3/2013 |
| CN | 104322019 | A | 1/2015 |
| CN | 104468343 | A | 3/2015 |
| CN | 105491670 | A | 4/2016 |
| EP | 2057784 | A2 | 5/2009 |
| JP | 2015005926 | A | 1/2015 |
| JP | 2016046697 | A | 4/2016 |
| KR | 20050053921 | A | 6/2005 |

OTHER PUBLICATIONS

ISA State Intellectual Property Office of the People's Republic of China, Written Opinion of the International Searching Authority Issued in Application No. PCT/CN2018/081573, WIPO, 4 pages.
State Intellectual Property Office of the People's Republic of China, Office Action and Search Report Issued in Application No. 201710209173.8, dated Nov. 21, 2019, 11 pages. (Submitted with Partial Translation).
European Patent Office, Extended European Search Report Issued in Application No. 18774481.8, dated Jan. 28, 2020, Germany, 9 pages.
State Intellectual Property Office of the People's Republic of China, Office Action and Search Report Issued in Application No. 201710209173.8, dated Apr. 18, 2019, 11 pages. (Submitted with Partial Translation).
ISA State Intellectual Property Office of the People's Republic of China, International Search Report Issued in Application No. PCT/CN2018/081573, dated Jun. 7, 2018, WIPO, 8 pages.
Japanese Patent Office, Office Action Issued in Application No. 2019-553826, dated Sep. 29, 2020, 13 pages. (Submitted with Machine Translation).

* cited by examiner

DETECTING PATH

CROSS REFERENCE TO RELATED APPLICATIONS

This present application is a U.S. National Phase of International Patent Application Serial No. PCT/CN2018/081573 entitled "PATH DETECTION," filed on Apr. 2, 2018. International Patent Application Serial No. PCT/CN2018/081573 claims priority to Chinese Patent Application No. 201710209173.8 filed on Mar. 31, 2017. The entire contents of each of the above-cited applications are hereby incorporated by reference in their entirety for all purposes.

BACKGROUND

To implement IP network operation and maintenance, a path of a service flow in a network is desired to be detected.

A traceroute mechanism can be used for path detection. The traceroute mechanism includes sending a detection packet based on an IP address of a target host (abbreviated as a target IP address) to detect the path of the service flow from a source host to the target host.

The detection packet in the traceroute mechanism is different from a packet for the service flow, e.g., a port number of the detection packet is different from a port number of the packet for the service flow, so as to avoid that the detection packet has an effect on the service flow.

DETAILED DESCRIPTION OF THE EMBODIMENTS

The foregoing disclosure is merely illustrative of preferred embodiments of the disclosure but is not intended to limit the disclosure, and any modifications, equivalent substitutions, adaptations, thereof made without departing from the spirit and scope of the disclosure shall be encompassed in the claimed scope of the appended claims.

In a traceroute mechanism, forwarding information in a packet head of a detection packet for detecting a path of a service flow is different from forwarding information in a packet head of the service flow. A UDP port number is taken as an example of the forwarding information. A plurality of UDP port numbers correspond to a plurality of pre-defined applications. In the traceroute mechanism, to avoid that the detection packet has an effect on a practical service application, a UDP port number in the packet head of the detection packet can be a designated UDP port number not corresponding to any service application (e.g., a UDP port number more than 30000), which is different from the UDP port number corresponding to an application of a service flow in the packet head of the service flow. When there are equal cost paths or Policy Based Routing (PRB), a forwarding path is selected based on forwarding information in a packet head of a packet regardless whether the packet is the detection packet or the forwarded service flow. Since the forwarding information in the packet head of the detection packet is different from the forwarding information in the packet head of the service flow, it is caused that the path detected based on the detection packet is different from an actual path corresponding to the service flow.

In an example of the present disclosure, a forwarding device constructs a detection packet for detecting a path corresponding to a service flow based on a packet head of the actual service flow. When the detection packet is forwarded based on the forwarding information in the packet head of the detection packet, it can be ensured that a forwarding action corresponding to the detection packet is consistent with the forwarding action corresponding to the actual service flow, thus, an accurate path corresponding to the actual service flow can be determined.

Figure 1:
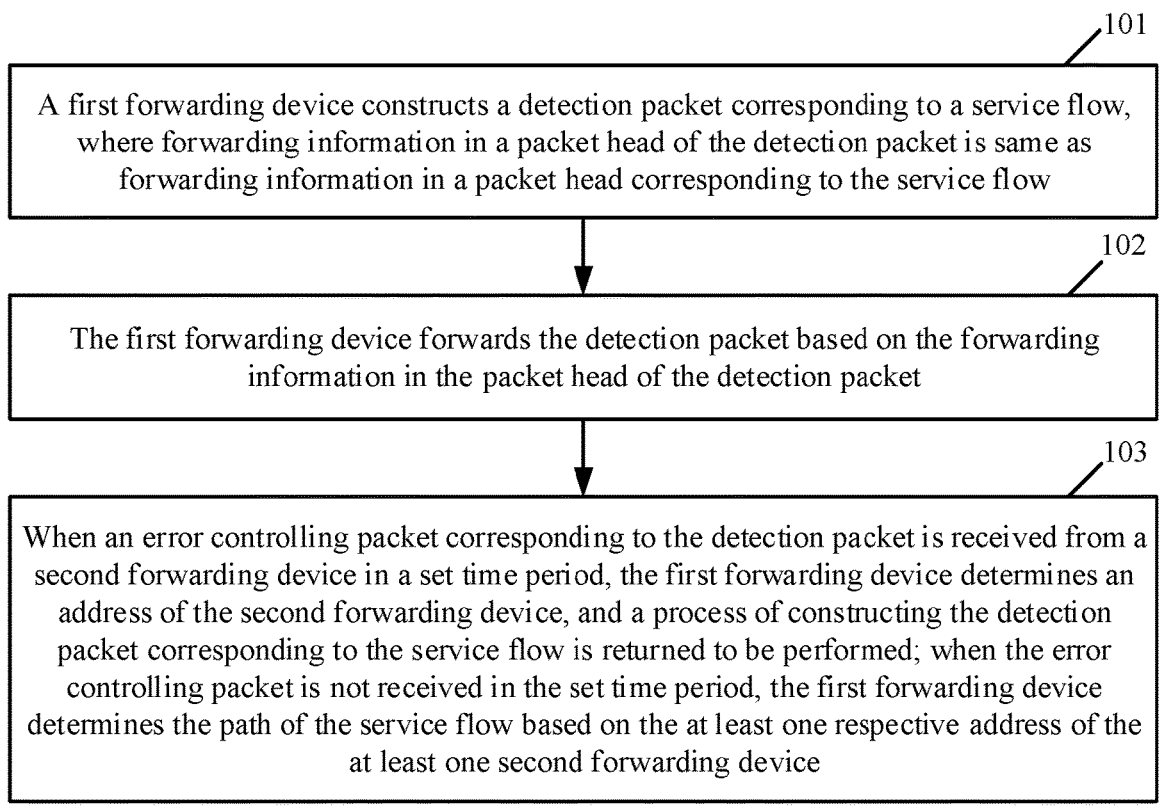
FIG. 1 is a flowchart illustrating a method based on the present disclosure.

FIG. 1 is a flowchart illustrating a method based on the present disclosure. The method can be applied to a forwarding device on a path of a service flow. The forwarding device may be a router, which is not limited in examples of the present disclosure.

As shown in FIG. 1, the method includes procedures as follows.

At block 101, a first forwarding device constructs a detection packet for a service flow, where forwarding information in a packet head of the detection packet is same as forwarding information in a packet head of the service flow.

In an example, the forwarding information in the packet head of the detection packet may be notified by an external control device. The external control device may be an SDN controller or a network management device, which is not limited in examples of the present disclosure.

In examples of present disclosure, regardless how many detection packets corresponding to the service flow are constructed in block 101, forwarding information in packet heads of the constructed detection packets is same with each other, which is the forwarding information in the packet head of the service flow. In an example, the external control device sends the forwarding information to the forwarding device once.

In an example, the first forwarding device may be an initial forwarding device on the path of the service flow. The external control device may determine the initial forwarding device on the path of the service flow based on a method as follows. Each path from a source IP address to a target IP address is calculated based on the source IP address, the target IP address and network topology managed by the external control device. For each path, sampling is performed for an initial forwarding device on the path, and the initial forwarding device through which the service flow passes is determined to be the first forwarding device on the path of the service flow based on the sampling way.

In an example, the process of constructing the detection packet for the service flow in block 101 may depend on whether another detection packet has been constructed for the service flow. When it is determined that no detection packet has been constructed for the service flow, a TTL in the packet head of the detection packet constructed in block 101 is an initial value. When it is determined the another detection packet has been constructed for the service flow, the TTL in the packet head of the detection packet constructed in block 101 is equal to a sum of the TTL in a last detection packet and a preset value. The preset value may be equal to the initial value, e.g., 1.

In examples of the present disclosure, the packet head of the detection packet constructed in block 101 further includes a checksum. The checksum is set to be a designed check value indicating a checksum error. Thus, a target host of the service flow discards the detection packet based on the designated check value when receiving the detection packet.

In an example, the packet head of the detection packet includes an Internet Protocol (IP) head and a transport layer protocol head (e.g., a Transmission Control Protocol (TCP)/User Datagram Protocol (UDP) head). The TTL is a field in the IP head. The checksum is a field in the TCP/UDP head. The forwarding information in the IP head includes a source IP address, a target IP address, a protocol type and a Differentiated Services Code Point (DSCP). The forwarding information in the TCP/UDP head includes a source port number and a target port number.

In an example, another head may be added into the detection packet constructed in block 101. For example, when a path of VXLAN packets is to be detected, a VXLAN head is added into the detection packet constructed in block 101.

At block 102, the first forwarding device forwards the detection packet based on the forwarding information in the packet head of the detection packet.

Figure 2:
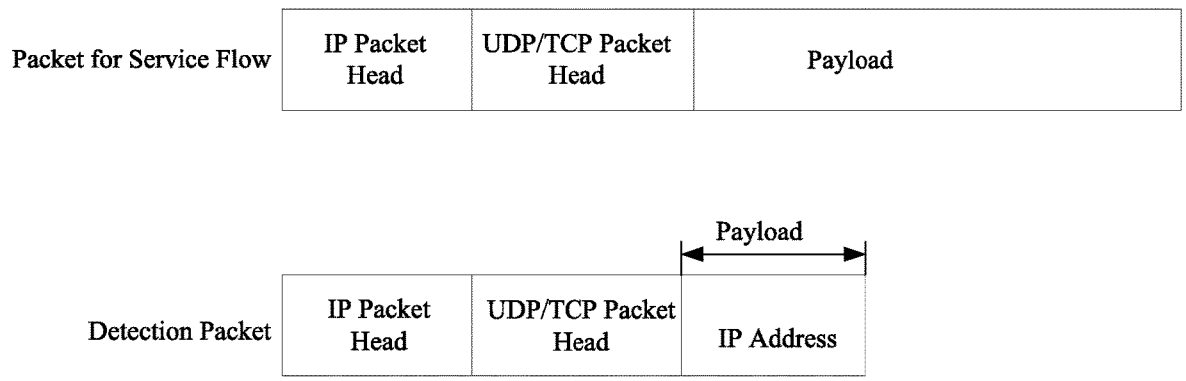
FIG. 2 is a schematic diagram illustrating respective structures of packets based on the present disclosure.

In an example, an address of the first forwarding device is carried in a payload of the detection packet forwarded by the first forwarding device, such that the second forwarding device returns an error controlling packet corresponding to the detection packet to the first forwarding device when the second forwarding device receives the detection packet. FIG. 2 is a schematic diagram illustrating a structure of a service flow packet and a structure of a detection packet based on an example.

In a service flow forwarding application, when there are equal cost paths or PBR, set calculation is performed based on the forwarding information in the packet head of the service flow, a next hop is determined based on a calculation result, and the service flow is forwarded to the next hop. In examples of the present disclosure, when the detection packet is forwarded based on the forwarding information in the packet head of the detection packet in block 102, the set calculation is performed based on the forwarding information in the packet head of the detection packet, the next hop is determined based on the calculation result, and the detection packet is forwarded to the next hop. Thus, it can be ensured that the forwarding path of the detection packet is consistent with the forwarding path of the service flow even though there are the equal cost paths or the PRB. That is because the forwarding information in the packet head of the detection packet is same as the forwarding information in the packet head of the service flow. In an example, the set calculation is routing calculation such as hash calculation.

At block 103, when an error controlling packet corresponding to the detection packet is received from a second forwarding device in a set time period, the first forwarding device determines an address of the second forwarding device, and a process of constructing the detection packet for the service flow is returned to be performed; when the error controlling packet is not received in the set time period, the first forwarding device determines the path of the service flow based on the at least one respective address of the at least one second forwarding device.

In an example, the set time period may be defined based on a time period desired for service flow transmission in the actual path, which is not limited in examples of the present disclosure.

In an example, the second forwarding device subtracts a preset value (1 is taken as an example) from the TTL in the packet head of the detection packet after receiving the detection packet, and returns the error controlling packet to the first forwarding device when the obtained TTL is equal to a value indicating that an error occurs in a process of forwarding the detection packet (e.g., zero).

In examples of the present disclosure, when the first forwarding device does not receive the error controlling packet from the second forwarding device in the set time period, the path detecting process ends. A reason that the first forwarding device does not receive the error controlling packet from the second forwarding device in the set time period is as follows. A target host receives the detection packet, parses the received detection packet, and determines that the checksum in the packet head is the check value indicating a checksum error (e.g., 0×0, or another value), thus, discards the detection packet, which causes that the first forwarding device cannot receive the error controlling packet corresponding to the detection packet in the set time period.

The process of determining the path of the service flow based on the received error controlling packet in block 103 is described in detail below, which is not repeatedly described here.

So far, the process in FIG. 1 ends.

In examples of the present disclosure, the first forwarding device constructs the detection packet used for detecting the path corresponding to the service flow based on the packet head of the actual service flow, and forwards the detection packet based on the forwarding information in the packet head of the detection packet. Thus, it can be ensured that a forwarding action corresponding to the detection packet is consistent with a forwarding action corresponding to the actual service flow. The first forwarding device determines the address of the second forwarding device when receiving the error controlling packet corresponding to the detection packet in the set time period, such that an accurate path corresponding to the actual service flow can be determined.

The process in FIG. 1 is described in detail below.

Figure 3:
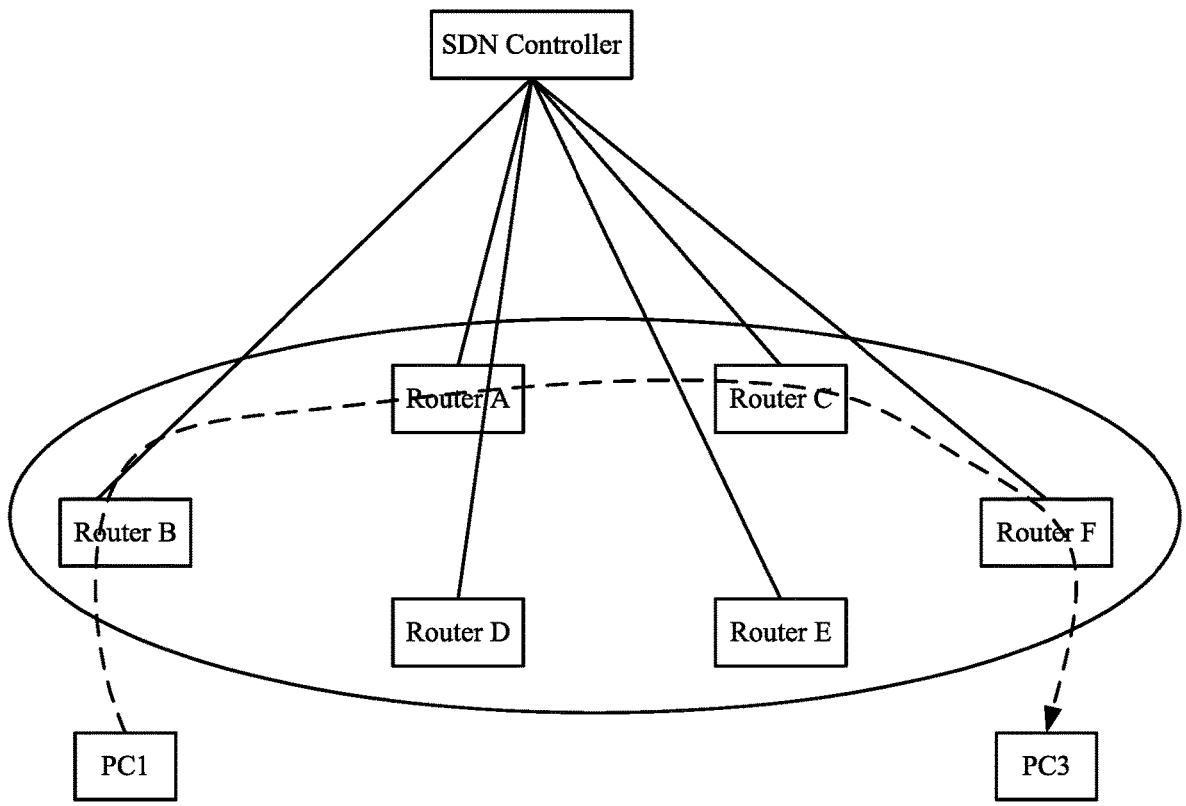
FIG. 3 is a schematic diagram illustrating path detection based on an example of the present disclosure.

FIG. 3 is a schematic diagram illustrating path detection based on an example of the present disclosure. In the example, a path of a service flow is determined based on recorded respective source addresses of error controlling packets. A path of a service flow, Flow 1, is taken as an example to describe the method below.

Figure 4A:
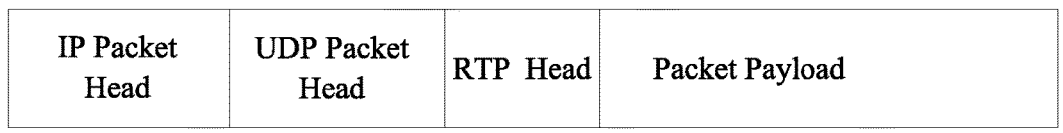
FIGS. 4a-4c are schematic diagrams illustrating respective structures of packets based on an example of the present disclosure.

In the example, it is assumed that the Flow 1 includes video packets, a source address of the Flow 1 is an IP address of a PC 1 (denoted as IP 1), and a target address of the Flow 1 is an IP address of a PC 3 (denoted as IP 3). A structure of the Flow 1 is shown in FIG. 4a.

An SDN controller calculates possible paths for the Flow 1 based on the source IP address of the Flow 1, the target address of the Flow 1 and a network topology of a network in FIG. 3. For each of the obtained paths, the SDN controller performs sampling for the service on an initial forwarding device of the path. A Router B is determined to be an initial forwarding device for the Flow 1 based on the sampling way.

The SDN controller sends forwarding information in the packet head of the Flow 1 to the initial forwarding device Router B on the path of the Flow 1. The forwarding information includes forwarding information in an IP head of the Flow 1 and forwarding information in a UDP head of the Flow 1. In an example, the forwarding information in the IP head of the Flow 1 incudes the source IP address (IP 1), the target IP address (IP 3), a protocol type and DSCP. In another example, the forwarding information in the UDP head of the Flow 1 includes a source port number and a target port number.

The Router B receives and stores the forwarding information.

Figure 4B:
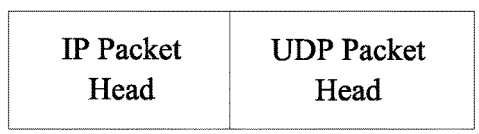

The Router B constructs a first detection packet for detecting the Flow 1. To make description clearer, the detection packet is denoted as a detection packet 3_1. A TTL in an IP head of the detection packet 3_1 is an initial value (1 is taken as an example). The IP head of the detection packet 3_1 further includes the received forwarding information in the IP head of the Flow 1, such as the source IP address (IP 1), the target IP address (IP 3), the protocol type and the DSCP. A checksum in an UDP head of the detection packet 3_1 is a designated check value indicating a checksum error. The UDP head of the detection packet 3_1 further includes the received forwarding information in the UDP head of the Flow 1, such as the source port number and the target port number. FIG. 4b is a schematic diagram illustrating a structure of the detection packet 3_1.

Figure 4C:
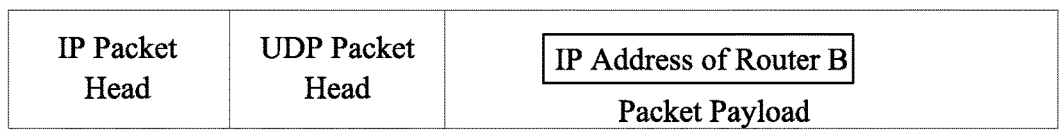

The Router B adds the IP address of the Router B into a payload of the detection packet 3_1. FIG. 4c is a schematic diagram illustrating a structure of the detection packet 3_1 including the IP address of the Router B.

The Router B forwards the detection packet 3_1 based on the forwarding information in the IP address of the detection packet 3_1 and the forwarding information in the UDP head of the detection packet 3_1. It is assumed that the Router B forwards the detection packet 3_1 finally to a Router A based on the forwarding information in the IP address of the detection packet 3_1 and the forwarding information in the UDP head of the detection packet 3_1.

The Router A receives the detection packet 3_1.

The Router A subtracts a preset value (1 is taken as an example) from the TTL of the detection packet 3_1 to obtain a value 0. It is determined that an error occurs in a process of forwarding the detection packet 3_1.

The Router A parses the payload of the detection packet 3_1 to obtain the IP address of the Router B, and returns an error controlling packet corresponding to the detection packet 3_1 to the Router B based on the IP address of the Router B. A source IP address of the error controlling packet is an IP address of the Router A. A target IP address of the error controlling packet is the IP address of the Router B. The forwarding information in the packet head of the detection packet 3_1 (the forwarding information in the IP head and the forwarding information in the UDP head) is further carried in the error controlling packet, such that the Router B can recognize to which service flow the error controlling packet corresponds.

When receiving the error controlling packet returned from the Router A in a set time period, the Router B records the source IP address of the error controlling packet, e.g., the IP address of the Router A.

The Router B generates a second detection packet for detecting the path of the Flow 1. To make description clearer, the second packet is denoted as a detection packet 3_2. A packet head of the detection packet 3_2 is same as the packet head of the detection packet 3_1 except the TTL. In an example, the TTL in the detection packet 3_2 is equal to a sum of the TTL in the detection packet 3_1 and a preset value (1 is taken as an example). The TTL in the detection packet 3_2 is equal to 2.

The Router B adds the IP address of the Router B into the payload of the detection packet 3_2.

The Router B forwards the detection packet 3_2 based on the forwarding information in the IP head of the detection packet 3_2 and the forwarding information in the UDP head of the detection packet 3_2. It is assumed that the Router B forwards the detection packet 3_2 finally to the Router A based on the forwarding information in the IP head of the detection packet 3_2 and the forwarding information in the UDP head of the detection packet 3_2.

The Router A receives the detection packet 3_2.

The Router A subtracts the preset value (1 is taken as an example) from the TTL in the detection packet 3_2 to obtain a value 1. It is determined that no error occurs in the process of forwarding the detection packet 3_2. The TTL in the detection packet 3_2 is updated to be 1.

The Router A forwards the detection packet 3_2 based on the forwarding information in the IP head of the detection packet 3_2 and the forwarding information in the UDP head of the detection packet 3_2. It is assumed that the Router A forwards the detection packet 3_2 finally to a Router C based on the forwarding information in the IP head of the detection packet 3_2 and the forwarding information in the UDP head of the detection packet 3_2.

The Router C receives the detection packet 3_2.

The Router C subtracts the preset value (1 is taken as an example) from the TTL in the detection packet 3_2 to obtain a value 0. It is determined that an error occurs in the process of forwarding the detection packet 3_2.

The Router C parses the payload of the detection packet 3_2 to obtain the IP address of the Router B, returns an error controlling packet corresponding to the detection packet 3_2 to the Router B based on the IP address of the Router B. A source IP address of the error controlling packet is an IP address of the Router C. A target IP address of the error controlling packet is the IP address of the Router B. The forwarding information in the packet head of the detection packet 3_2 (the forwarding information in the IP head and the forwarding information in the UDP head) is further carried in the error controlling packet, such that the Router B can recognize to which service flow the error controlling packet corresponds.

When receiving the error controlling packet returned from the Router C in the set time period, the Router B records the source IP address of the error controlling packet, e.g., the IP address of the Router C.

The Router B generates a third detection packet for detecting the Flow 1. To make description clearer, the third detection packet is denoted as a detection packet 3_3. A packet head of the detection packet 3_3 is same as the packet head of the detection packet 3_2 except the TTL. In an example, the TTL in the detection packet 3_3 is equal to a sum of the TTL in the detection packet 3_2 and the preset value (1 is taken as an example). The TTL in the packet head of the detection packet 3_3 is equal to 3.

The Router B adds the IP address of the Router B into the payload of the detection packet 3_3, and forwards the detection packet 3_3 based on the forwarding information in the IP head of the detection packet 3_3 and the forwarding information in the UDP head of the detection packet 3_3. It is assumed that the Router B forwards the detection packet 3_3 finally to the Router A based on the forwarding information in the IP head of the detection packet 3_3 and the forwarding information in the UDP head of the detection packet 3_3.

The Router A receives the detection packet 3_3.

The Router A subtracts the preset value (1 is taken as an example) from the TTL of the detection packet 3_3 to obtain a value 2. It is determined that no error occurs in the process of forwarding the detection packet 3_3. The TTL of the detection packet 3_3 is updated to be 2.

The Router A forwards the detection packet 3_3 based on the forwarding information in the IP head of the detection packet 3_3 and the forwarding information in the UDP head of the detection packet 3_3. It is assumed that the Router A forwards the detection packet 3_3 finally to the Router C based on the forwarding information in the IP head of the detection packet 3_3 and the forwarding information in the UDP head of the detection packet 3_3.

The Router C receives the detection packet 3_3.

The Router C subtracts the preset value (1 is taken as an example) from the TTL of the detection packet 3_3 to obtain a value 1. It is determined that no error occurs in the process of forwarding the detection packet 3_3. The TTL of the detection packet 3_3 is updated to be 1.

The Router C forwards the detection packet 3_3 based on the forwarding information in the IP head of the detection packet 3_3 and the forwarding information in the UDP head of the detection packet 3_3. It is assumed that the Router C forwards the detection packet 3_3 finally to a Router F based on the forwarding information in the IP head of the detection packet 3_3 and the forwarding information in the UDP head of the detection packet 3_3.

The Router F receives the detection packet 3_3.

The Router F subtracts the preset value (1 is taken as an example) from the TTL of the detection packet 3_3 to obtain a value 0. It is determined that an error occurs in the process of forwarding the detection packet 3_3.

The Router F parses the payload of the detection packet 3_3 to obtain the IP address of the Router B, returns an error controlling packet corresponding to the detection packet 3_3 to the Router B based on the IP address of the Router B. A source address of the error control packet is the IP address of the Router F. A target address of the error control packet is the IP address of the Router B. The forwarding information in the packet head of the detection packet 3_3 (the forwarding information in the IP head and the forwarding information in the UDP head) is further carried in the error controlling packet, such that the Router B can recognize to which service flow the error controlling packet corresponds.

When receiving the error controlling packet returned from the Router F in the set time period, the Router B records the source IP address of the error controlling packet, e.g., the IP address of the Router F.

The Router B generates a fourth detection packet used for detecting the path of the Flow 1. To make description clearer, the fourth detection packet is denoted as a detection packet 3_4. A packet head of the detection packet 3_4 is same as the packet head of the detection packet 3_3 except the TTL. The TTL in the detection packet 3_4 is equal to a sum of the TTL in the detection packet 3_3 and the preset value (1 is taken as an example). The TTL in the packet head of the detection packet 3_4 is equal to 4.

The Router B adds the IP address of the Router B into the payload of the detection packet 3_4, and forwards the detection packet 3_4 based on the forwarding information in the IP head of the detection packet 3_4 and the forwarding information in the UDP head of the detection packet 3_4. It is assumed that the Router B forwards the detection packet 3_4 finally to the Router A based on the forwarding information in the IP head of the detection packet 3_4 and the forwarding information in the UDP head of the detection packet 3_4.

The Router A receives the detection packet 3_4.

The Router A subtracts the preset value (1 is taken as an example) from the TTL of the detection packet 3_4 to obtain a value 3. It is determined that no error occurs in the process of forwarding the detection packet 3_4. The TTL of the detection packet 3_4 is updated to be 3.

The Router A forwards the detection packet 3_4 based on the forwarding information in the IP head of the detection packet 3_4 and the forwarding information in the UDP head of the detection packet 3_4. It is assumed that the Router A forwards the detection packet 3_4 finally to the Router C based on the forwarding information in the IP head of the detection packet 3_4 and the forwarding information in the UDP head of the detection packet 3_4.

The Router C receives the detection packet 3_4.

The Router C subtracts the preset value (1 is taken as an example) from the TTL of the detection packet 3_4 to obtain a value 2. It is determined that no error occurs in the process of forwarding the detection packet 3_4. The TTL in the detection packet 3_4 is updated to be 2.

The Router C forwards the detection packet 3_4 based on the forwarding information in the IP packet head of the detection packet 3_4 and the forwarding information in the UDP packet head of the detection packet 3_4. It is assumed that the Router C forwards the detection packet 3_4 finally to the Router F based on the forwarding information in the IP packet head of the detection packet 3_4 and the forwarding information in the UDP packet head of the detection packet 3_4.

The Router F receives the detection packet 3_4.

The Router F subtracts the preset value (1 is taken as an example) from the TTL of the detection packet 3_4 to obtain a value 1. It is determined that no error occurs in the process of forwarding the detection packet 3_4. The TTL is updated to be 1 in the detection packet 3_4.

The Router F forwards the detection packet 3_4 based on the forwarding information in the IP packet head of the detection packet 3_4 and the forwarding information in the UDP packet head of the detection packet 3_4. It is assumed that the Router F forwards the detection packet 3_4 finally to the PC 3 based on the forwarding information in the IP packet head of the detection packet 3_4 and the forwarding information in the UDP packet head of the detection packet 3_4.

The PC 3 receives the detection packet 3_4, and performs parsing for the UDP packet head of the detection packet 3_4 to determine that the checksum in the UDP packet head of the detection packet 3_4 is the designed check value indicating a checksum error (0×0 is taken as an example), thus, PC 3 discards the detection packet 3_4.

When the Router B does not receive an error controlling packet corresponding to the detection packet 3_4 in the set time period, a process of detecting the path for the Flow 1 ends.

The Router B constructs the path of the Flow 1 based on the recorded IP addresses of the Routers A, C and F. In an example, the path of the Flow 1 is constructed in combination with the network topology.

So far, the process in the example ends.

Figure 5:
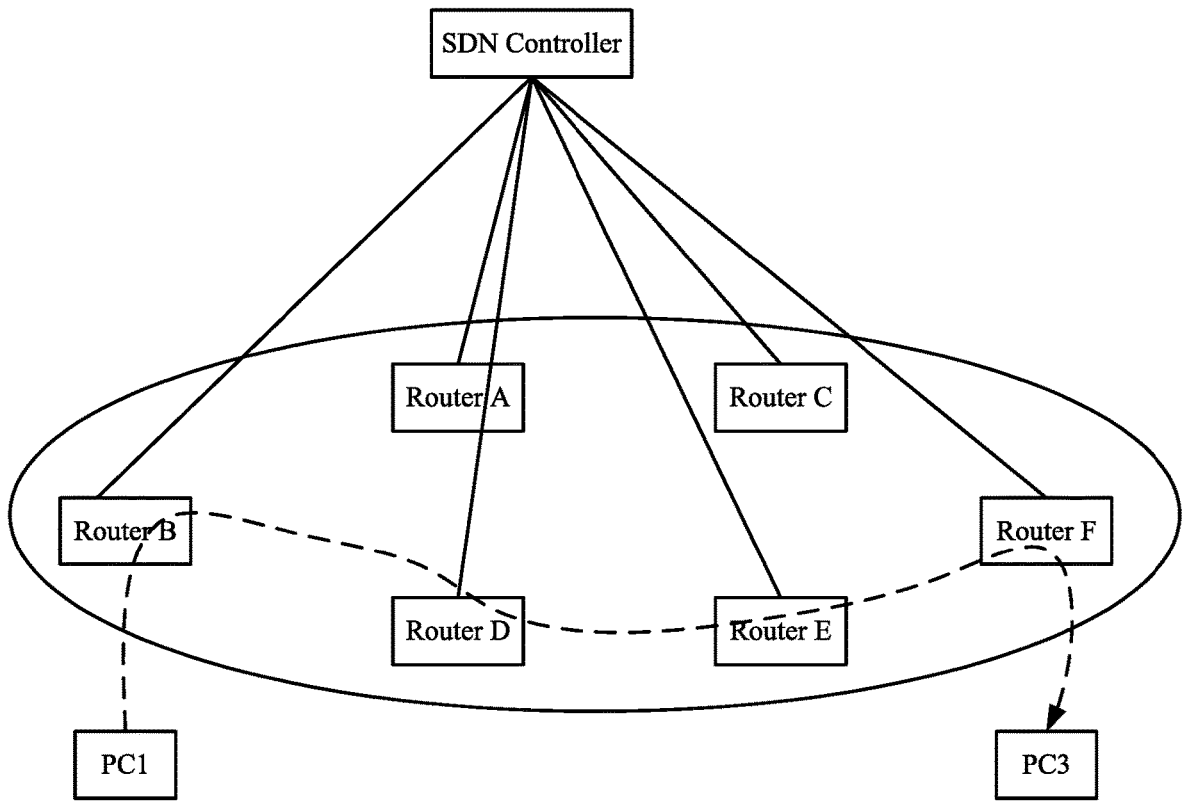
FIG. 5 is a schematic diagram based on an example of the present disclosure.

FIG. 5 is a schematic diagram illustrating path detection in another example of the present disclosure. In the example, during a forwarding device constructs a detection packet, an address of the forwarding device is carried in a payload of the constructed detection packet when no detection packet for the service flow has been constructed; and an address of a forwarding device in a payload of a last detection packet and a source address of an error controlling packet corresponding to the last detection packet are carried in the payload of the constructed detection packet when another detection packet for the service flow has been constructed. The address of the forwarding device in the payload of the last detection packet and the source address of the error controlling packet corresponding to the last detection packet are sorted based on a preset order. The source address may be carried in a payload of the error controlling packet corresponding to the last detection packet, or may be carried in an IP head of the error controlling packet corresponding to the last detection packet. The address of the forwarding device is at a designated field in the payload of the constructed detection packet, e.g., a first field in the payload, such that another forwarding device obtains the address of the forwarding device from the designated field and returns the error controlling packet corresponding to the detection packet to the obtained address when the another forwarding device receives the detection packet. In the example, the path of the service flow is determined based on addresses in the payload of the detection packet constructed and sent at a last time. Thus, the forwarding device is not desired to record the respective source addresses of the error controlling packets, such that flexibility can be enhanced.

A process of detecting a path of Flow 2 is taken as an example below.

Figure 6A:
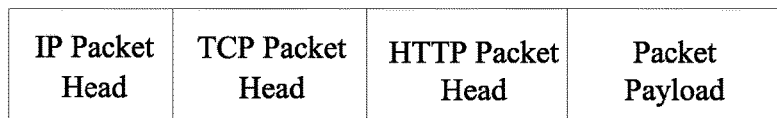
FIGS. 6a-6f are schematic diagrams illustrating respective structures of packets based on an example of the present disclosure.

In the example, it is assumed that the Flow 2 includes internet browsing packets, a source IP address is an IP address of the PC 1 (denoted as IP 1), a target IP address is an IP address of PC 3 (denoted as IP 3). A packet structure of the Flow 2 is as shown in FIG. 6a. A process of detecting the path of the Flow 2 includes procedures as follows.

An SDN controller calculates possible paths of the Flow 2 based on the source IP address of the Flow 2, the target address of the Flow 2 and a network topology of a network in FIG. 5. For each of the obtained paths, the SDN controller performs sampling for the service on an initial forwarding device of the path. A Router B is determined to be an initial forwarding device for the Flow 2 by the sampling way.

The SDN controller sends forwarding information in the packet head of the Flow 2 to the initial forwarding device Router B on the path of the Flow 2. The forwarding information includes forwarding information in an IP head of the Flow 2 and forwarding information in a TCP head of the Flow 2. The forwarding information in the IP head of the Flow 2 includes such as the source IP address (IP 1), the target IP address (IP 3), a protocol type and DSCP. The forwarding information in the TCP head of the Flow 2 includes such as a source port number and a target port number.

The Router B receives and stores the forwarding information.

Figure 6B:
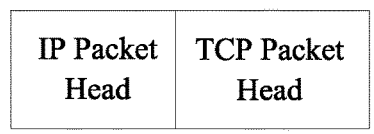

The Router B constructs a first detection packet for detecting the Flow 2. To make description clearer, the detection packet is denoted as a detection packet 5_1. A TTL in the IP head of the detection packet 5_1 is an initial value (1 is taken as an example). The IP head of the detection packet 5_1 further includes the received forwarding information in the IP head of the Flow 2, such as the source IP address (IP 1), the target IP address (IP 3), the protocol type and the DSCP. A checksum in the TCP head of the detection packet 5_1 is a designated check value indicating a checksum error (0x0 is taken as an example). The TCP head of the detection packet 5_1 further includes the received forwarding information in the TCP head of the Flow 2, such as the source port number and the target port number. FIG. 6b illustrates a structure of the detection packet 5_1.

Figure 6C:
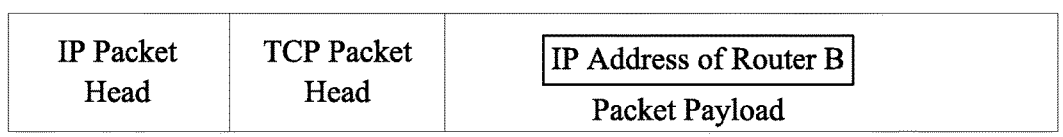

The Router B adds an IP address of the Router B into a payload of the detection packet 5_1 (at a first field of the payload as an example). FIG. 6c is a schematic diagram illustrating a structure of the detection packet 5_1 including the IP address of the Router B.

The Router B forwards the detection packet 5_1 based on the forwarding information in the IP address of the detection packet 5_1 and the forwarding information in the TCP head of the detection packet 5_1. It is assumed that the Router B forwards the detection packet 5_1 finally to a Router D based on the forwarding information in the IP address of the detection packet 5_1 and the forwarding information in the TCP head of the detection packet 5_1.

The Router D receives the detection packet 5_1.

The Router D subtracts a preset value (1 is taken as an example) from the TTL of the detection packet to obtain a value 0. It is determined that an error occurs in a process of forwarding the detection packet 5_1.

The Router D parses the payload of the detection packet 5_1 to obtain the IP address of the Router B at the designated field, returns an error controlling packet corresponding to the detection packet 5_1 to the Router B. A source IP address of the error controlling packet is an IP address of the Router D. A target IP address of the error controlling packet is the IP address of the Router B. The forwarding information in the packet head of the detection packet 5_1 (the forwarding information in the IP head and the forwarding information in the TCP head) is carried in the payload of the error controlling packet, such that the Router B can recognize to which service flow the error controlling packet corresponds. The IP address of the Router D is further carried in the payload of the error controlling packet.

Figure 6D:
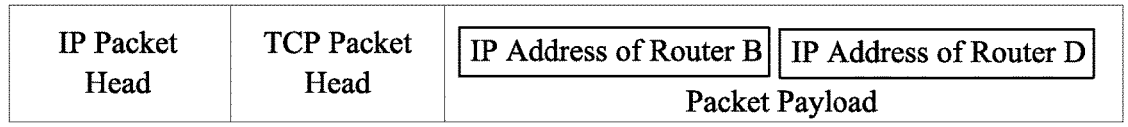

When receiving the error controlling packet returned from the Router D in a set time period, the Router B generates a second detection packet of the Flow 2. To make description clearer, the second detection packet as the current detection packet is denoted as a detection packet 5_2. A packet head of the detection packet 5_2 is same as the packet head of the detection packet 5_1 except the TTL. In an example, the TTL in the detection packet 5_2 is equal to a sum of the TTL in the detection packet 5_1 and the preset value (1 is taken as an example). The TTL in the detection packet 5_2 is equal to 2. The IP address of the Router B in the payload of the detection packet 5_1 and the IP address of the Router D in the payload of the error controlling packet are carried in the payload of the detection packet 5_2. The IP address of the Router B may be at a designated field in the payload (a first field in the payload is taken as an example), such that another forwarding device receiving the detection packet 5_2 can obtain the IP address of the Router B at the designated field in the detection packet 5_2 and returns an error controlling packet to the IP address of the Router B. The IP address of the Router B and the IP address of the Router D are sorted in order in the payload of the detection packet 5_2. In an example, the IP address of the Router D is sorted behind the IP address of the Router B. FIG. 6d is a schematic diagram illustrating a packet structure of a detection packet 5_2. A method of carrying IP addresses in a payload of each detection packet below is same as the method for the detection packet 5_2, which is not repeatedly described.

The Router B forwards the detection packet 5_2 based on the forwarding information in the IP head of the detection packet 5_2 and the forwarding information in the TCP head of the detection packet 5_2. It is assumed that Router B forwards the detection packet 5_2 finally to the Router D based on the forwarding information in the IP head of the detection packet 5_2 and the forwarding information in the TCP head of the detection packet 5_2.

The Router D receives the detection packet 5_2.

The Router D subtracts the preset value (1 is taken as an example) from the TTL in the detection packet 5_2 to obtain a value 1. Thus, it is determined that no error occurs in the process of forwarding the detection packet 5_2. The TTL in the detection packet 5_2 is updated to be 1.

The Router D forwards the detection packet 5_2 based on the forwarding information in the IP head of the detection packet 5_2 and the forwarding information in the TCP head of the detection packet 5_2. It is assumed that the Router D forwards the detection packet 5_2 finally to a Router E based on the forwarding information in the IP head of the detection packet 5_2 and the forwarding information in the TCP head of the detection packet 5_2.

The Router E receives the detection packet 5_2.

The Router E subtracts the preset value (1 is taken as an example) from the TTL in the detection packet 5_2 to obtain a value 0. Thus, it is determined that an error occurs in the process of forwarding the detection packet 5_2.

The Router E parses the payload of the detection packet 5_2 to obtain the IP address of the Router B at the designated field, e.g., a first IP address in the front, returns an error controlling packet corresponding to the detection packet 5_2 to the Router B based on the IP address of the Router B. A source IP address of the error controlling packet is an IP address of the Router E. A target IP address of the error controlling packet is the IP address of the Router B. The forwarding information in the packet head of the detection packet 5_2 (the forwarding information in the IP head and the forwarding information in the TCP head) and the IP address of the Router E are further carried in the payload of the error controlling packet.

When receiving the error controlling packet returned from the Router E in the set time period, the Router B generates a third detection packet for detecting the Flow 2. To make description clearer, the third detection packet is denoted as a detection packet 5_3. A packet head of the detection packet 5_3 is same as the packet head of the detection packet 5_2 except the TTL. In an example, the TTL in the detection packet 5_3 is equal to a sum of the TTL in the detection packet 5_2 and the preset value (1 is taken as an example). The TTL in the packet head of the detection packet 5_3 is equal to 3.

Figure 6E:
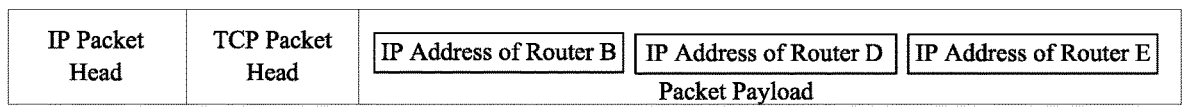

The IP addresses of the Routers B and D in the payload of the detection packet 5_2 and the IP address of the Router E in the payload of the received error controlling packet are carried in the payload the detection packet 5_3. The IP address of the Router B is at a designated field in the payload (a first field of the payload is taken as an example). The IP address of the Router E is sorted behind the IP address of the Router D in order. FIG. 6e is a schematic diagram illustrating a packet structure of the detection packet 5_3.

The Router B forwards the detection packet 5_3 based on the forwarding information in the IP head of the detection packet 5_3 and the forwarding information in the TCP head of the detection packet 5_3. It is assumed that the Router B forwards the detection packet 5_3 finally to the Router D based on the forwarding information in the IP head of the detection packet 5_3 and the forwarding information in the TCP head of the detection packet 5_3.

The Router D receives the detection packet 5_3.

The Router D subtracts the preset value (1 is taken as an example) from the TTL of the detection packet 5_3 to obtain a value 2. It is determined that no error occurs in the process of forwarding the detection packet 5_3. The TTL of the detection packet 5_3 is updated to be 2.

The Router D forwards the detection packet 5_3 based on the forwarding information in the IP head of the detection packet 5_3 and the forwarding information in the TCP head of the detection packet 5_3. It is assumed that the Router D forwards finally to the Router E the detection packet 5_3 based on the forwarding information in the IP head of the detection packet 5_3 and the forwarding information in the TCP head of the detection packet 5_3.

The Router E receives the detection packet 5_3.

The Router E subtracts the preset value (1 is taken as an example) from the TTL of the detection packet 5_3 to obtain a value 1. It is determined that no error occurs in the process of forwarding the detection packet 5_3. The TTL of the detection packet 5_3 is updated to be to be 1.

The Router E forwards the detection packet 5_3 based on the forwarding information in the IP head of the detection packet 5_3 and the forwarding information in the TCP head of the detection packet 5_3. It is assumed that the Router E forwards the detection packet 5_3 finally to a Router F based on the forwarding information in the IP head of the detection packet 5_3 and the forwarding information in the TCP head of the detection packet 5_3.

The Router F receives the detection packet 5_3.

The Router F subtracts the preset value (1 is taken as an example) from the TTL of the detection packet 3_3 to obtain a value 0. It is determined that an error occurs in the process of forwarding the detection packet 5_3.

The Router F parses the detection packet 5_3 to obtain the IP address of the Router B at the preset field, e.g., a first IP address, returns an error controlling packet corresponding to the detection packet 5_3 to the Router B based on the IP address of the Router B. A source IP address of the error controlling packet is an IP address of the Router F. A target IP address of the error controlling packet is the IP address of the Router B. The forwarding information in the packet head of the detection packet 5_3 (the forwarding information in the IP head and the forwarding information in the TCP head) and the IP address of the Router F are further carried in the error controlling packet.

Figure 6F:
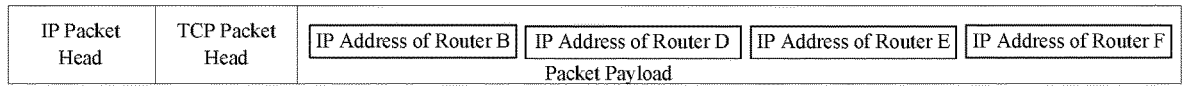

When receiving the error controlling packet returned from the Router F in the set time period, the Router B generates a fourth detection packet for detecting the Flow 2. To make description clearer, the fourth detection packet is denoted as a detection packet 5_4. A packet head of the detection packet 5_4 is same as the packet head of the detection packet 5_3 except the TTL. In an example, the TTL in the detection packet 5_4 is equal to a sum of the TTL in the detection packet 5_3 and the preset value (1 is taken as an example). The TTL in the packet head of the detection packet 5_4 is equal to 4. The IP addresses of the Routers B, D and E sorted in order in the payload of the detection packet 5_3 and the IP address of the Router F in the payload of the received error controlling packet are carried in the payload of the detection packet 5_4. The IP address of the Router F is sorted behind the IP address of the Router E in order. FIG. 6f illustrates a packet structure of the detection packet 5_4.

The Router B forwards the detection packet 5_4 based on the forwarding information in the IP head of the detection packet 5_4 and the forwarding information in the TCP head of the detection packet 5_4. It is assumed that the Router E forwards the detection packet 5_4 finally to the Router D based on the forwarding information in the IP head of the detection packet 5_4 and the forwarding information in the TCP head of the detection packet 5_4.

The Router D receives the detection packet 5_4.

The Router D subtracts the preset value (1 is taken as an example) from the TTL of the detection packet 5_4 to obtain a value 3. It is determined that the TTL of the detection packet 5_4 is updated to 3.

The Router D forwards the detection packet 5_4 based on the forwarding information in the IP head of the detection packet 5_4 and the forwarding information in the TCP head of the detection packet 5_4. It is assumed that the Router D forwards the detection packet 5_4 finally to the Router E based on the forwarding information in the IP head of the detection packet 5_4 and the forwarding information in the TCP head of the detection packet 5_4.

The Router E receives the detection packet 5_4.

The Router E subtracts the preset value (1 is taken as an example) from the TTL of the detection packet 5_4 to obtain a value 2. It is determined that no error occurs in the process of forwarding the detection packet 5_4. The TTL in the detection packet 5_4 is updated to be 2.

The Router E forwards the detection packet 5_4 based on the forwarding information in the IP packet head of the detection packet 5_4 and the forwarding information in the TCP packet head of the detection packet 5_4. It is assumed that the Router E forwards the detection packet 5_4 finally to the Router F based on the forwarding information in the IP packet head of the detection packet 5_4 and the forwarding information in the TCP packet head of the detection packet 5_4.

The Router F receives the detection packet 5_4.

The Router F subtracts the preset value (1 is taken as an example) from the TTL of the detection packet 5_4 to obtain a value 1. It is determined that no error occurs in the process of forwarding the detection packet 5_4. The TTL in the detection packet 5_4 is updated to be 1.

The Router F forwards the detection packet 5_4 based on the forwarding information in the IP packet head of the detection packet 5_4 and the forwarding information in the TCP packet head of the detection packet 5_4. It is assumed that the Router F forwards the detection packet 5_4 finally to the PC 3 based on the forwarding information in the IP packet head of the detection packet 5_4 and the forwarding information in the TCP packet head of the detection packet 5_4.

The PC 3 receives the detection packet 5_4, parses the TCP packet of the detection packet 5_4 to determine that the checksum is the designed check value indicating a checksum error (0×0 is taken as an example), thus, the PC 3 discards the detection packet 5_4.

When no error controlling packet returned for the detection packet 5_4 is received in the set time period by the Router B, the path detecting process for the Flow 2 ends.

The Router B constructs the path of the Flow 2 based on the IP addresses of different forwarding devices (the respective IP addresses of the Routers B, D, E and F) in the payload of the detection packet 5_4 generated at a last time. In an example, the path of the Flow 2 is constructed in combination with network topology, which is not repeatedly described herein.

So far, the process in the example ends.

Methods according to the present disclosure are described above. Devices according to the present disclosure are described below.

Figure 8:
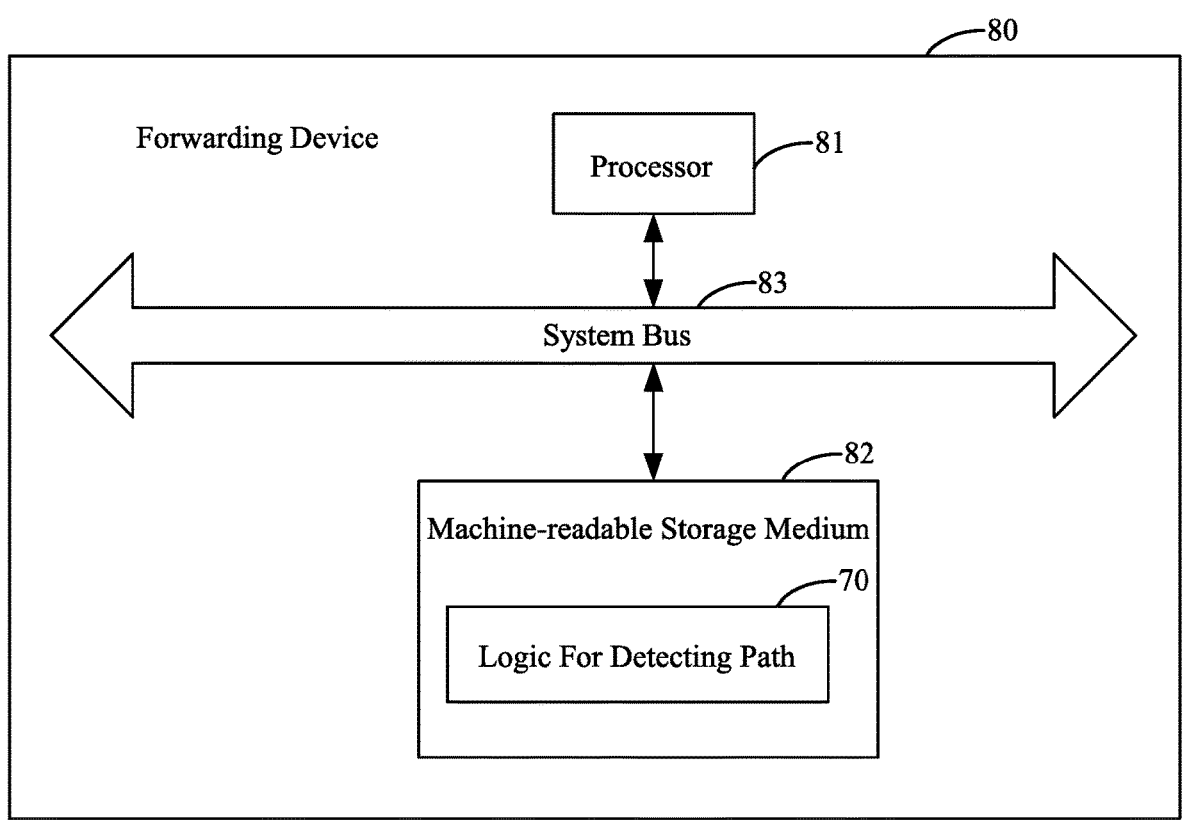
FIG. 8 is a schematic diagram illustrating a hardware structure of a forwarding device based on the present disclosure.

FIG. 8 schematically illustrates a hardware structure diagram of a forwarding device, which is provided by an example of the present disclosure. The forwarding device 80 may include a processor 81 and a machine-readable storage medium 82 storing machine executable instructions. The processor 81 may communicate with the machine-readable storage medium 82 via a system bus 83, and execute the methods of detecting a path described above by reading and executing the machine executable instructions corresponding to a logic 70 for detecting a path in the machine-readable storage medium 82.

As used herein, the machine-readable storage medium 82 may be any electronic, magnetic, optical, or other physical storage apparatus to contain or store information such as executable instructions, data, and the like. For example, any machine-readable storage medium 82 described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

Figure 7:
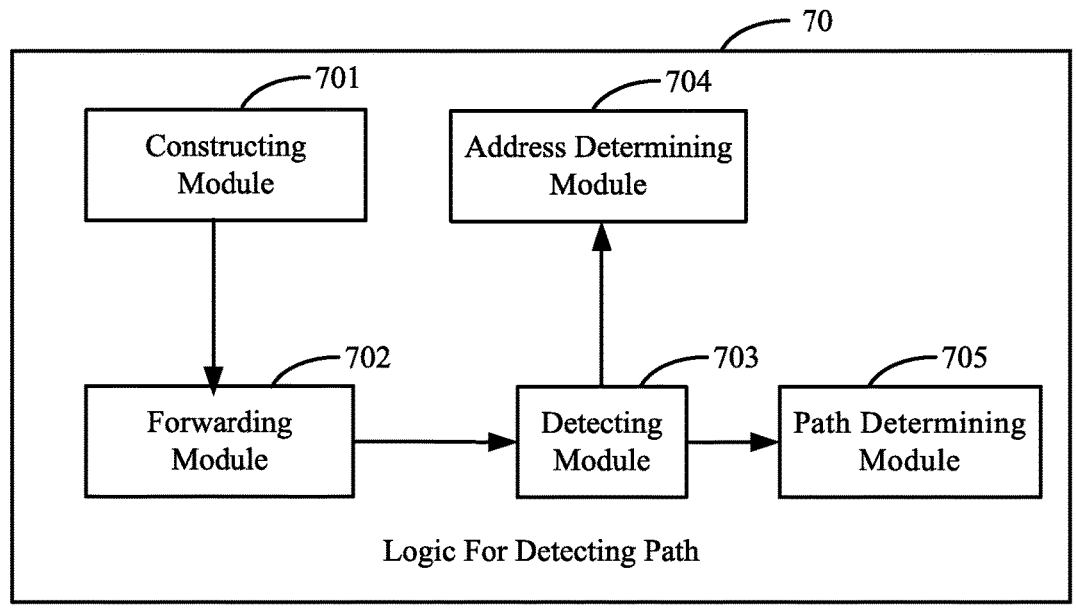
FIG. 7 is a schematic diagram illustrating a structure of a logic for detecting a path based on the present disclosure.

As shown in FIG. 7, functionally divided, the logic 70 for detecting a path above may include modules as follows.

A constructing module 701 is configured to construct a detection packet for a service flow, wherein forwarding information in a packet head of the detection packet is same as forwarding information in a packet head of the service flow.

A forwarding module 702 is configured to forward the detection packet based on the forwarding information in the packet head of the detection packet.

A detecting module 703 is configured to detect whether an error controlling packet corresponding to the detection packet is received from another forwarding device in a set time period.

An address determining module 704 is configured to, when an error controlling packet corresponding to the detection packet is received from another forwarding device in a set time period, determine an address of the another forwarding device, and return to the constructing module 701 to perform a process of constructing the detection packet for the service flow.

A path determining module 705 is configured to determine the path of the service flow based on the at least one respective address of the at least one another forwarding device when a detect result of detecting module 703 is no.

In an example, the packet head of the detection packet comprises a checksum, the checksum is set to be a designed check value indicating a checksum error, such that a target host of the service flow discards the detection packet when receiving the detection packet.

In an example, the packet head of the detection packet comprises an Internet Protocol (IP) head and a transport layer protocol head; the checksum is a field in the transport layer protocol head; the forwarding information in the IP head comprises an source IP address, a target IP address, a protocol type and a Differentiated Services Code Point (DSCP); and the forwarding information in the head of the transport protocol head comprises a source port number and a target port number.

In an example, an address of the forwarding device is carried in a payload of the detection packet constructed by the constructing module 701, such that the another forwarding device returns the error controlling packet corresponding to the detection packet to the forwarding device when the another forwarding device receives the detection packet.

In an example, the address of the another forwarding device determined by the address determining module 704 is a source address of the error controlling packet. The address determining module 704 is further configured to record the source address, wherein the at least one recorded source address is sorted based on an order of receiving the at least one corresponding error controlling packet. The determined path of the service flow is formed by at least one another forwarding device corresponding to the at least one source address recorded by the forwarding device.

In an example, when no detection packet for the service flow has been constructed, the address of the forwarding device is carried in a payload of the detection packet constructed by the constructing module 701. When another detection packet for the service flow has been constructed, an address of a forwarding device in a payload of a last detection packet and a source address of an error controlling packet corresponding to the last detection packet are carried in the payload of the detection packet constructed by the constructing module 701, wherein the source address is carried in a payload of the error controlling packet corresponding to the last detection packet, and the address of the forwarding device in the payload of the last detection packet and the source address are sorted based on a preset order in the payload of the detection packet. The address of the forwarding device is at a designated field of the payload of the constructed detection packet, such that the another forwarding device obtains the address of the forwarding device from the designated field and returns the error controlling packet corresponding to the detection packet to the forwarding device when the another forwarding device receives the detection packet.

In an example, the address of the another forwarding device determined by the address determining module 704 is a source address of the received error controlling packet, and the source address is carried in the payload of the error controlling packet. The determined path of the service flow is formed by a forwarding device corresponding to an address in a payload of a detection packet constructed and sent by the forwarding device at a last time.

So far, the description about the structure of the logic for detecting the path of FIG. 7 ends.

Since the device embodiments substantially correspond to the method embodiments, a reference may be made to part of the descriptions of the method embodiments for the related part. The device embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of detecting a path, comprising:
   i) constructing, by a first forwarding device, a detection packet for a service flow, wherein forwarding information in a packet head of the detection packet is same as forwarding information in a packet head of the service flow;
   ii) forwarding, by the first forwarding device, the detection packet based on the forwarding information in the packet head of the detection packet;
   iii) when an error controlling packet corresponding to the detection packet is received from a second forwarding device in a set time period, determining, by the first forwarding device, an address of the second forwarding device; and
   iteratively performing the steps of i), ii), and iii) until no error controlling packet corresponding to the detection packet is received from the second forwarding device in the set time period; and
   determining, by the first forwarding device, the path of the service flow based on at least one respective address of at least one second forwarding device when the error controlling packet is not received in the set time period,
   wherein the packet head of the detection packet comprises a checksum, and
   wherein the checksum is set to be a designed check value indicating a checksum error, such that a target host of the service flow discards the detection packet when receiving the detection packet.

2. The method according to claim 1, wherein
   the packet head of the detection packet comprises an Internet Protocol (IP) head and a transport layer protocol head; and
   the checksum is a field in the transport layer protocol head;
   wherein the forwarding information in the IP head comprises a source IP address, a target IP address, a protocol type and a Differentiated Services Code Point (DSCP); and
   wherein the forwarding information in the head of the transport protocol head comprises a source port number and a target port number.

3. The method according to claim 2, wherein an address of the first forwarding device is carried in a payload of the detection packet, such that the second forwarding device returns the error controlling packet corresponding to the detection packet to the first forwarding device when the second forwarding device receives the detection packet.

4. The method according to claim 3, wherein the determined address of the second forwarding device is a source address of the error controlling packet;

the method further comprises:
  recording the source address, wherein the at least one recorded source address is sorted based on an order of receiving the at least one corresponding error controlling packet; and
  determining the path of the service flow comprises: forming the flow by the at least one second forwarding device corresponding to the at least one source address recorded by the first forwarding device.

5. The method according to claim 2, wherein
when no detection packet for the service flow has yet been constructed, an address of the first forwarding device is carried in a payload of a first constructed detection packet; and
when a currently constructed detection packet for the service flow is directly or indirectly subsequent to the first constructed detection packet for the service flow, an address of a forwarding device in a payload of a direct previous detection packet and a source address of an error controlling packet corresponding to the direct previous detection packet are carried in the payload of the constructed detection packet, wherein the source address is carried in a payload of the error controlling packet corresponding to the direct previous detection packet, and the address of the forwarding device in the payload of the direct previous detection packet and the source address are sorted based on a preset order, wherein
the address of the first forwarding device is at a designated field of the payload of the constructed detection packet, such that the second forwarding device obtains the address of the first forwarding device from the designated field and returns the error controlling packet corresponding to the detection packet to the first forwarding device when the second forwarding device receives the detection packet.

6. The method according to claim 5, wherein the determined address of the second forwarding device is the source address of the error controlling packet corresponding to the detection packet, and the source address is carried in the payload of the error controlling packet corresponding to the detection packet;
  determining the path of the service flow comprises: forming the flow by a forwarding device corresponding to an address in a payload of a detection packet constructed and sent by the first forwarding device at a last time.

7. A forwarding device, comprising:
a processor, and
a machine-readable storage medium storing machine executable instructions which are executable by the processor, the processor is caused by the machine executable instructions to:
  i) construct a detection packet for a service flow, wherein forwarding information in a packet head of the detection packet is same as forwarding information in a packet head of the service flow;
  ii) forward the detection packet based on the forwarding information in the packet head of the detection packet;
  iii) when an error controlling packet corresponding to the detection packet is received from another forwarding device in a set time period, determine an address of the another forwarding device, and iteratively perform the steps of i), ii), and iii) until no error controlling packet corresponding to the detection packet is received from the another forwarding device in the set time period; and
  determine the path of the service flow based on at least one respective address of at least one another forwarding device when the error controlling packet is not received in the set time period,
wherein the packet head of the detection packet comprises a checksum, and
wherein the checksum is set to be a designed check value indicating a checksum error, such that a target host of the service flow discards the detection packet when receiving the detection packet.

8. The forwarding device according to claim 7, wherein
the packet head of the detection packet comprises an Internet Protocol (IP) head and a transport layer protocol head; and
the checksum is a field in the transport layer protocol head;
wherein the forwarding information in the IP head comprises a source IP address, a target IP address, a protocol type and a Differentiated Services Code Point (DSCP); and
wherein the forwarding information in the head of the transport protocol head comprises a source port number and a target port number.

9. The forwarding device according to claim 8, wherein an address of a first forwarding device is carried in a payload of the detection packet, such that the another forwarding device returns the error controlling packet corresponding to the detection packet to the first forwarding device when the another forwarding device receives the detection packet.

10. The forwarding device according to claim 9, wherein the determined address of the another forwarding device is a source address of the error controlling packet;
  the processor is caused by the machine executable instructions further to:
    record the source address, wherein the at least one recorded source address is sorted based on an order of receiving the at least one corresponding error controlling packet; and
  determining the path of the service flow comprises: forming the flow by the at least one another forwarding device corresponding to the at least one source address recorded by the forwarding device.

11. The forwarding device according to claim 9, wherein
when no detection packet for the service flow has yet been constructed, an address of the first forwarding device is carried in a payload of a first constructed detection packet; and
when a currently constructed detection packet for the service flow is directly or indirectly subsequent to the first constructed detection packet for the service flow, an address of a forwarding device in a payload of a direct previous detection packet and a source address of an error controlling packet corresponding to the direct previous detection packet are carried in the payload of the constructed detection packet, wherein the source address is carried in a payload of the error controlling packet corresponding to the direct previous detection packet, and the address of the forwarding device in the payload of the direct previous detection packet and the source address are sorted based on a preset order, wherein
the address of the first forwarding device is at a designated field of the payload of the constructed detection packet, such that the second forwarding device obtains the address of the first forwarding device from the designated field and returns the error controlling packet corresponding to the detection packet to the first forwarding device when the second forwarding device receives the detection packet.

12. The forwarding device according to claim 11, wherein the determined address of the another forwarding device is the source address of the error controlling packet corresponding to the detection packet, and the source address is carried in the payload of the error controlling packet corresponding to the detection packet;

determining the path of the service flow comprises: forming the flow by a forwarding device corresponding to an address in a payload of a detection packet constructed and sent by the forwarding device at a last time.

13. A non-transitory machine-readable storage medium storing machine executable instructions which are invoked and executed by a processor of a network device, the machine executable instructions cause the processor to:

i) construct a detection packet for a service flow, wherein forwarding information in a packet head of the detection packet is same as forwarding information in a packet head of the service flow;

ii) forward the detection packet based on the forwarding information in the packet head of the detection packet;

iii) when an error controlling packet corresponding to the detection packet is received from another forwarding device in a set time period, determine an address of the another forwarding device; and iteratively perform the steps of i), ii), and iii) until no error controlling packet corresponding to the detection packet is received from the another forwarding device in the set time period; and determine the path of the service flow based on at least one respective address of at least one another forwarding device when the error controlling packet is not received in the set time period, wherein the packet head of the detection packet comprises a checksum, and the checksum is set to be a designed check value indicating a checksum error, such that a target host of the service flow discards the detection packet when receiving the detection packet.

* * * * *

UNITED STATES PATENT AND TRADEMARK OFFICE
CERTIFICATE OF CORRECTION

PATENT NO. : 11,025,535 B2
APPLICATION NO. : 16/499219
DATED : June 1, 2021
INVENTOR(S) : Jinglin Li It is certified that error appears in the above-identified patent and that said Letters Patent is hereby corrected as shown below:

On the Title Page

Item [87], delete "April 10, 2018" insert --October 4, 2018--.

Signed and Sealed this
Thirty-first Day of May, 2022

Katherine Kelly Vidal
*Director of the United States Patent and Trademark Office*